United States Patent [19]
Polson

[11] 3,844,273

[45] Oct. 29, 1974

[54] METHOD AND APPARATUS FOR ANIMAL HEAT DETECTION AND RECORDING

[75] Inventor: Jerry H. Polson, Boulder, Colo.

[73] Assignee: Contel Corporation, Boulder, Colo.

[22] Filed: Apr. 24, 1972

[21] Appl. No.: 246,681

[52] U.S. Cl. .................... 128/2 R, 119/1, 119/51 R
[51] Int. Cl. ........................................... A61b 10/00
[58] Field of Search ................ 128/2 R; 119/1, 51 R

[56] References Cited
UNITED STATES PATENTS

| | | | |
|---|---|---|---|
| 3,297,020 | 1/1967 | Mathiesen | 119/1 |
| 3,076,431 | 2/1963 | Rule et al. | 119/1 |
| 3,180,321 | 4/1965 | Aldinger | 119/51 R |
| 3,465,724 | 9/1969 | Broadbent | 119/51 R |
| 3,516,575 | 6/1970 | Moffitt | 222/52 |
| 3,541,995 | 11/1970 | Fathauer | 119/51 R |
| 3,557,757 | 1/1971 | Brooks | 119/51 R |

Primary Examiner—Aldrich F. Medbery
Attorney, Agent, or Firm—Duane Burton

[57] ABSTRACT

A method of and an electronic apparatus for detecting and recording the onset of a particular animal phenomena such as the sexual receptive/fertility period (heat) in animals is disclosed. A transmitter, attached to a female animal, is activated when that animal is "ridden" by another animal and transmitts a modulated signal. The transmitted signal is received by a suitable receiver when the ridden animal passes a predetermined location and, thus, provides an indication that the female animal has been "ridden." Alternatively, a highly directional antenna can be used in combination with a receiver to selectively locate a ridden female animal in a herd of animals by virtue of the ridden animal having an activated transmitter. In addition to transmitting a signal, the transmitter also includes a timer. The timer is activated concurrently with the activation of the transmitter and records the passage of time. After the ridden animal has been isolated the timer is read out. Thus, an indication or record of the time between riding (onset of heat) and isolation is provided.

29 Claims, 8 Drawing Figures

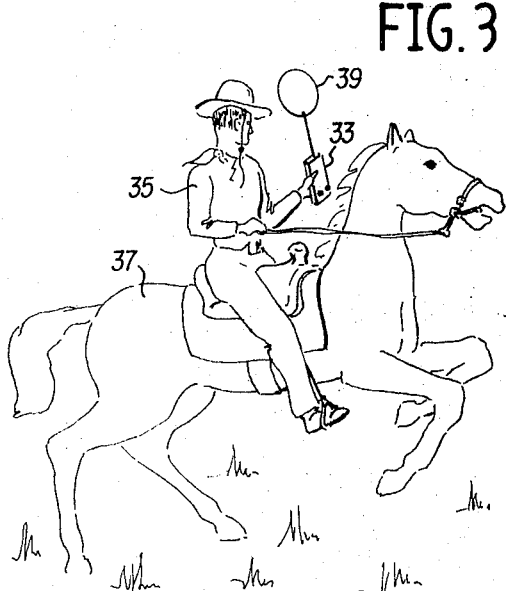
FIG. 3
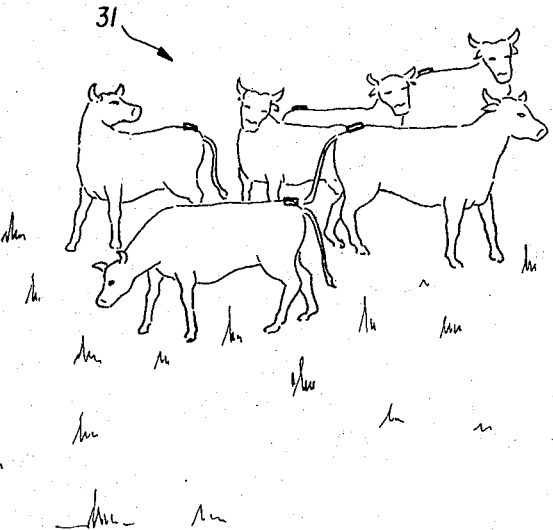
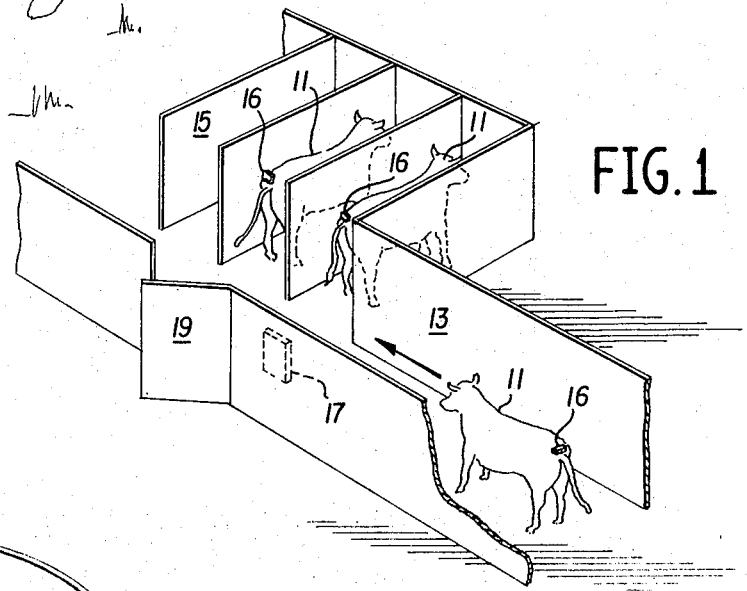
FIG. 1
FIG. 2
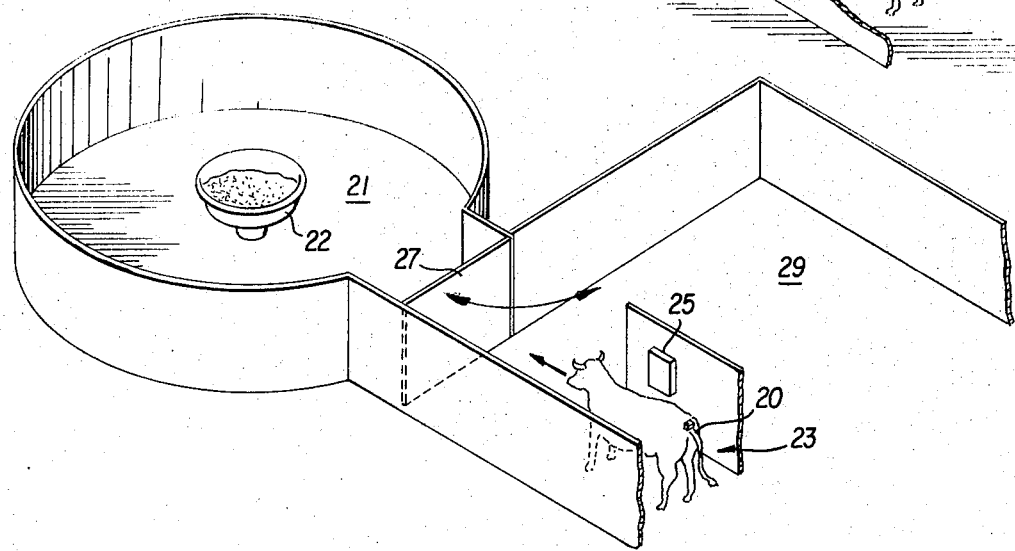

METHOD AND APPARATUS FOR ANIMAL HEAT DETECTION AND RECORDING

BACKGROUND OF THE INVENTION

This invention is generally directed to the detection and recording of the onset of a particular event such as the sexual receptive/fertility period in animals (commonly known as heat or standing heat) and more particularly to the detection and recording of the onset of heat in dairy and beef cows.

In recent years, the artificial insemination of both dairy and beef cattle has risen to the point where millions of such cattle are inseminated every year. Obviously, it is necessary that every beef and dairy cow be in heat when it is artifically inseminated. The most common approach to determining whether a cow is in heat has been visual observation by herdsmen.

The visual signs that indicate heat cover a wide range. Under normal conditions, a female in heat will stand and accept service by a bull. In addition, she will stand and permit herself to be ridden by other animals, i.e., heifers, steers or calves of either sex. Moreover, heifers and cows when in heat become more active and alert. They have bright eyes, are restless and may bellow. Often they walk in search of a bull. Further, they may pace along a fence, or try to go through it. Another sign that a female is in heat is that the visual genital organ - the vulva - becomes somewhat swollen and moist during heat. The vulva hairs are moistened and matted. In addition, the fine wrinkles of the vulva disappear. Sometimes clear mucus may be seen flowing from the vulva or smeared on the buttocks.

Sometimes cows that have recently been ridden show suggestive marks. For example, the hair over the tail head is disturbed. Moreover the fore feet of the ridding animal - especially if muddy - may leave marks on the sides and shoulders of the ridden female.

From the foregoing brief discussion of the signs of "heat" in a female animal, such as beef or dairy cow, it will be appreciated that it takes a relatively observant herdsman to observe the onset of standing heat. If the herdsman is not skilled in observing these visual signs, he can easily miss the occurrence of heat and, thus, cows in heat will not be artifically inseminated, as desired.

Various proposals have been made to determine the existence of heat in animals such as beef and dairy cows. The most commonly used device comprises a tube or capsule mounted on the tail head of the cow. The tube contains a suitably colored dye. When the cow is ridden, the tube or capsule breaks and the dye is spread over the tail head of the cow. While such devices have been somewhat satisfactory, they still require observation. Moreover, careful visual observation is necessary in order to determine if the dye mark is fresh or old.

Therefore, it is an object of this invention to provide a method of and an apparatus for determining when an animal is in standing heat.

It is also an object of this invention to provide a method of and an apparatus for automatically detecting the onset of standing heat and for automatically transmitting the detected information to a herdsman.

It is another object of this invention to provide a method of and an apparatus for detecting which cow from among a plurality of cows is in heat.

It is a still further object of this invention to provide a method of and an apparatus for automatically separating a cow that is in standing heat from a plurality of cows not in heat.

Another problem not adequately solved by the prior art relates to the determination of the time between the onset of standing heat and the observation of standing heat. More specifically, in order for artifical insemination to be successful, a cow must be inseminated in a particular time period after the onset of standing heat. As best understood this time period starts about 16 hours after the onset of standing heat and lasts for about 14 hours. Consequently it is not only necessary to know that a cow is in heat; it is also necessary to know the onset of heat.

Hence, it is yet another object of this invention to provide a method of and an apparatus for detecting the onset of standing heat and providing this information to a herdsman.

It is a still further object of this invention to provide a method of and an apparatus for detecting that an animal is in standing heat and recording the period of time between the start of standing heat and the segregation of the animal in heat from other animals.

It is still another object of this invention to provide a method of and an apparatus for detecting the occurrance of an event and recording the time from the occurrence of the event until the occurrance of another event.

SUMMARY OF THE INVENTION

In accordance with principles of this invention, a method of and an apparatus for animal heat detection and recording as well as animal segregation is provided.

The method generally comprises the steps of: detecting the occurrance of heat in an animal and transmitting a signal indicating the animal is in heat. The method further comprises the steps of receiving the transmitted signal and automatically or manually isolating the animal. A further step that may be included in the method is recording the passage of time between the onset of heat and the isolation of the cow in heat.

The apparatus of the invention comprises a heat detector unit, a receiver unit and a readout-charger unit. The heat detector unit comprises a pressure activated heat detection switch, a transmitter and, if desired, a timer. The heat detection switch is a pressure activated switch that is fastened by glue or a suitable harness to a predetermined position on the animal, such as on the tail head, if the animal is a cow, for example. Thus, the switch is positioned such that when the cow in heat is ridden by another cow the switch is activated. The transmitter and timer portions of the heat detection unit are mounted on the cow at any suitable location, such as in a strap around the cows neck or on the harness holding the switch in position, for examples. When the cow stands and is ridden, the switch activates the transmitter and timer portions. The timer, then begins recording the passage of time and the transmitter begins radiating a suitably modulated signal. One the transmitter and timer portions are activated, the heat detector unit continues to transmit and time until battery power is depleted or until the heat detection unit is reset.

When the cow passes a suitable position, such as the doorway of a milking parlor (assuming the cow is a dairy cow) a receiver tuned to the transmitter frequency receives the signal transmitted by the cow that has been ridden. The receiver activates a suitable indicator, such as a light or buzzer, for example, to notify a herdsman that the cow passing the receiver is in heat and should be isolated for breeding. After the cow has been isolated the herdsman attaches the heat detector unit to the readout-charger unit and activates a readout switch. When the readout switch is activated, the timer information is read out from the heat detection unit. Thus, the herdsman can determine exactly when the cow was first ridden after coming into "standing heat." At the same time the timer is readout, the charger portion of the readout-charger unit supplies current to charge the battery in the heat detection unit.

As an alternative to the cow entering the milking parlor, a herd of cows can be made to pass through a narrow alleyway in order to obtain food or drink. The receiver, located in the alleyway, instead of activating a light or buzzer, activates a gate which swings open in front of the cow causing her to enter a separate pen. As soon as she enters the pen, the gate closes behind her allowing the remaining cows to negotiate the alleyway to the food or drink in their normal manner. In this way, cows in heat are automatically segregated for breeding, without human intervention. A further alternative method is to utilize a portable high gain receiver coupled to a directional antenna instead of an alleyway mounted receiver. Such a portable receiver allows a rider on horseback, in a jeep or on foot, etc. to scan a herd and identify cows in heat. The identified cows can then be isolated from the herd by conventional "cutting" techniques.

It will be appreciated from the foregoing brief summary that, in general, the method of the invention comprises: activating a suitable switch when a cow is ridden; utilizing the switch activation to activate a suitable transmitter to transmit a signal; receiving the transmitted signal; and utilizing the received signal to activate an indicator or to open (or close) a gate. A modification of the method includes the steps of recording the elapsed time between transmitter activation and reception of the transmitted signal. The disclosed apparatus for carrying out the method generally comprises: a pressure sensitive switch mounted on the tail head of a cow; a transmitter and, if desired, a timer for transmitting a signal indicating heat and for recording the elapsed time since the onset of heat. The apparatus further comprises a receiver for receiving the transmitted signal and for providing an indication of the activation of a transmitter. Alternatively, if desired, the receiver can activate a mechanism for automatically opening a gate.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein:

FIG. 1 is a pictorial diagram illustrating a herd of cattle entering a milk parlor;

FIG. 2 is a pictorial diagram illustrating a herd of cows passing through an alleyway having a gate that when closed, automatically isolates the cows in heat from the remainder of the cows;

FIG. 3 illustrates a herd of cows and a herdsman on horseback holding a directional receiver used to detect which of the cows in the herd are in standing heat;

DESCRIPTION OF THE PREFERRED EMBODIMENT

Figure 4:
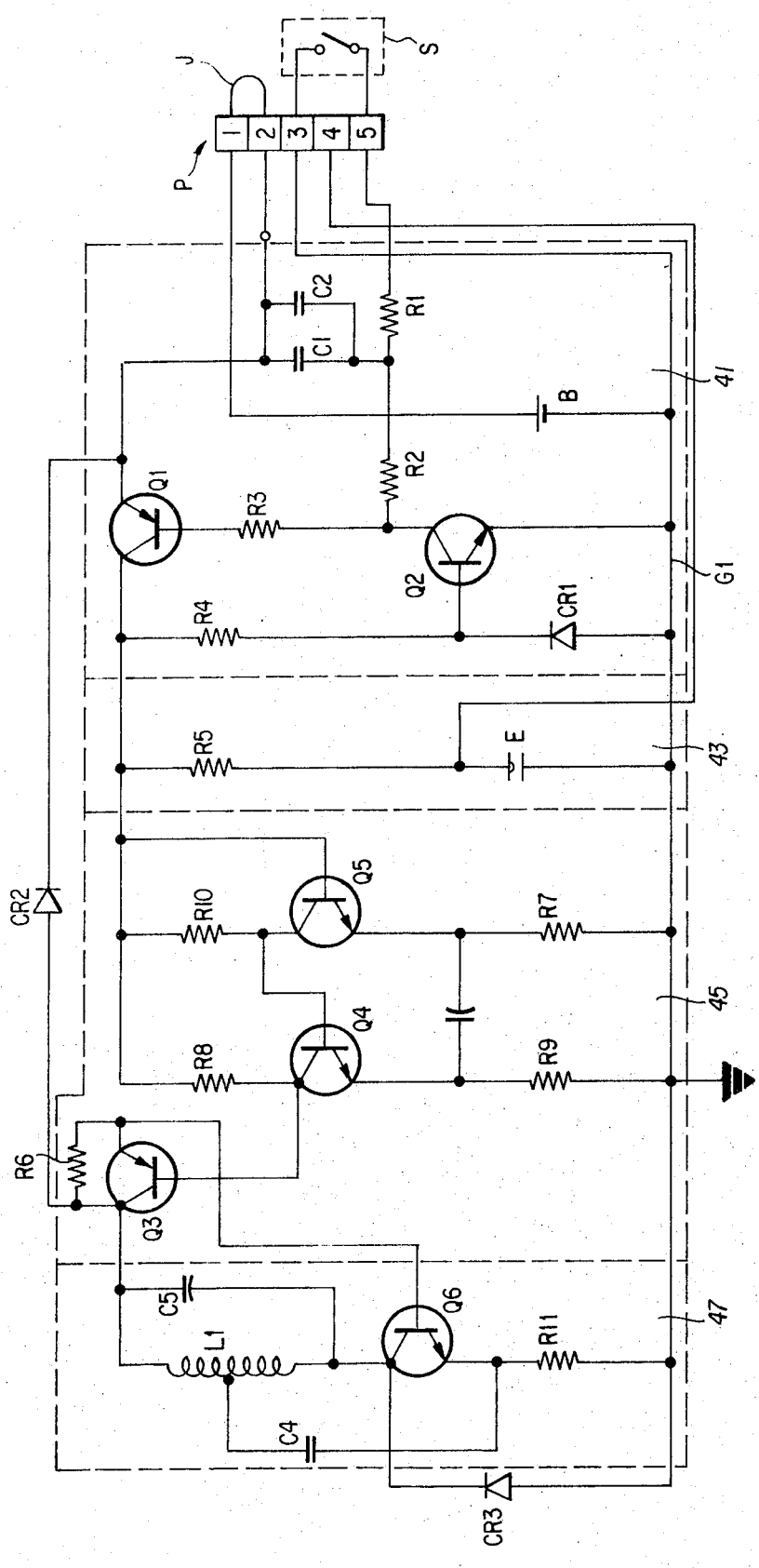
FIG. 4 is a schematic diagram of a heat detector unit.

The method of this invention generally comprises the steps of: detecting when a cow is in heat; transmitting a signal indicating that the cow is in heat; receiving the transmitted signal; and, isolating the cow in heat from the remaining cows. Preferably, the method of the invention also comprises the step of: measuring the elasped time between the onset of heat and the isolation of the cow in heat from the other cows.

FIG. 1 illustrates one form of the method of the invention and apparatus for carrying out the method. FIG. 1 illustrates a plurality of cows 11 passing through an entryway 13 into a milk parlor 15. Each of the cows has mounted thereon a heat detector unit 16 which comprises, as hereinafter described, a heat detector switch, a transmitter and, if desired, a timer.

As previously discussed, a cow that is in standing heat will allow herself to be ridden by other cows. When this occurs, the heat detector switch causes the transmitter to generate a modulated signal which is detected by a receiver unit 17 mounted at the end of the chute near the entrance to the milk parlor 15. If desired, the receiver unit can merely activate a suitable visual or audio indicator to inform an observing herdsman that the cow passing the receiver is in heat. The cow in heat can then be manually isolated from the remaining cows entering the milk parlor. Alternatively, the receiver can operate (open) a gate 19 and allow the cow to leave the milk parlor of its own accord or under suitable manual urging, as required. In either case the isolated cow is thereafter artifically inseminated using any comtemporary technique.

FIG. 2 illustrates an alternative arrangement wherein cows 20 are forced to enter a feeding and/or watering region 21 (containing a feed or water tank 22) via a suitable chute 23 each time they desired feed and/or water. A cow that has been ridden and whose transmitter is activated generates a signal that is received by a suitable receiver 25 located along the side of the chute. For purposes of illustration, the chute includes a single gate 27 activated by the receiver to 27 prevent the cow in heat from continuing through the chute to the feed and/or water region 21 and allow the cow to leave the chute and enter an isolation corral 29. Thereafter, cows in the isolation corral can be artifically inseminated in accordance with normal procedures.

FIG. 3 illustrates a still further arrangement for carrying out the method of the invention. In FIG. 3, a plurality of cows forming a herd 31 are scanned by receiver 33 held by a herdsman 35 mounted on a horse 37. More specifically, the receiver includes a high directional antenna 39 that is moved to scan the herd. When the antenna detects a transmitted signal the receiver indicates that a cow in heat lies along the "line of sight" of the antenna. Suitable further techniques well known in the radio direction locating art (e.g. triagulation) can be utilized to further isolate the cow in heat, depending upon the requirements of the situation, such as the size and composition of the herd. In any event, once the cow has been identified it is isolated from the herd for breeding by conventional "cutting" or other herding techniques well known in the beef cattle industry.

If desired, any of the heat detection units utilized in carrying out the methods illustrated in FIGS. 1, 2 and 3 can include a timer to record the elapsed time from the onset of heat. If such is the case, the method of the invention also comprises the step of measuring the elapsed time between the onset of heat (as determined by the time a cow is first ridden by another cow) and the point in time that the timer is readout.

FIG. 4 is a schematic diagram of a preferred embodiment of the heat detector unit of the invention and comprises: an activation circuit 41; and timer 43; a modulator 45; and a transmitter 47. Also illustrated in FIG. 4 is a connector block designated P having five terminals designated 1, 2, 3, 4 and 5 to which external circuits can be connected or across which jumper wires can be connected as required.

The activation circuit comprises: a PNP transistor deisgnated Q1; a NPN transistor designated Q2; a diode designated CR1; a battery designated B; two capacitors designated C1 and C2; and four resistors designated R1, R2, R3 and R4. Terminal 1 of P is connected to the positive end of B. The negative end of B is connected to a ground bus designated G1. Terminal 2 of P is connected to one end of C1 and to one end of C2. Terminal 2 is also connected to the emitter of Q1. C1 and C2 are connected together at their other ends and through R1 to terminal 5 of P. The other ends of C1 and C2 are also connected through R2 to the collector of Q2. The collector of Q2 is also connected through R3 to the base of Q1. The emitter of Q2 is connected to G1. The collector of Q1 is connected through R4 to the base of Q2 and to the cathode of CR1. The anode of CR1 is connected to G1.

The timer 43 comprises: an E-cell designated E and a resistor designated R5. R5 is connected in series with E between the collector of Q1, and G1. The junction between R5 and E is connected to terminal 4 of P. Terminal 3 of P is connected to G1.

The modulator 45 comprises: one PNP transistor designated Q3; two NPN transistors designated Q4 and Q5; a capacitor designated C3; and, five resistors designated R6, R7, R8, R9 and R10. The collector of Q1 is connected to the base of Q5 and through R10 to the collector of Q5. The emitter of Q5 is connected through R7 to G1. The collector of Q5 is also connected to the base of Q4 and the collector of Q4 is connected through R8 to the collector of Q1. The emitter of Q4 is connected through R9 to G1. The emitters of Q4 and Q5 are coupled together through C3. The emitter of Q3 is connected to the collector of Q1 and the base of Q3 is connected to the collector of Q4. The collector of Q3 is connected through R6 to the emitter of Q3.

The transmitter 47 comprises: a NPN transistor designated Q6; a loop antenna designated L1; two capacitors designated C4 and C5; and a resistor designated R11. The base of Q6 is connected to the emitter of Q3. The emitter of Q6 is connected through R11 to G1 and through C4 to a center tap on L1. One end of L1 is connected to the collector of Q3 and the other end of L1 is connected to the collector of Q6. C5 is connected in parallel with L1.

During storage, a wire jumper designated J is disconnected from terminals 1 and 2. Thus, B is disconnected from the remaining elements of the heat detector unit illustrated in FIG. 4. After the heat detector unit is mounted on a cow, it is placed in a "standby" mode by connecting J across terminals 1 and 2 of P. While the power of B is thus ready for use by the other elements of the circuit, the "standby" mode of operation is a passive mode because no elements draw power.

A remote single pole single throw pressure actuated switch designated S is connected across terminals 3 and 5 of P. As previously discussed, S is mounted on the tail head of a cow and held there by glue or a suitable harness. When the cow is ridden by another cow, the pressure against S caused by the ridding cow's brisket pressing against the ridden cow's tail head closes S. Closure of S activates the activation circuit 41 which in turn applies power to the timer 43, the modulator 45 and the transmitter 47 of the heat detector unit illustrated in FIG. 4. Power is applied to these circuits because when S is closed, terminals 3 and 5 of P are connected together. This connection grounds R1 causing Q1 to be momentarily triggered "on." When Q1 is triggered on, a current is applied through R4 to Q2. This current triggers Q2 on. Triggering Q2 on maintains Q1 in its on state.

In other words, as long as Q2 remains in a "off" condition or state, no DC base current flows to Q1, hence, Q1 stays biased off. Diode CR1 insures that Q2 remains off as long as no current flows through R4. However, since C1 is not charge during the standby mode of operation it has zero volts across its ends when S is closed. Thus, immediately upon the closure of S, current flows into C1. After an interval of time, the voltage developed across C1 causes Q1 to turn on. When Q1 turns on, a current flows through R4 and causes Q2 to turn on. Q2 thereafter maintains Q1 in the on state because it now applies a bias voltage to the base of Q1. C2 is a small capacitor that bypasses high frequencies which might exist on terminal 5 of P.

As soon as Q1 is biased on, the timer 43 starts to record the passage of time. More specifically, as soon as Q1 is triggered on, a constant current flows from B through R5 to E. The current is constant because Q1 is saturated. This current from B to E records the passage of time by transferring atoms of silver from one electrode to the other electrode in accordance with the conventional E-cell principles of operation.

As will be best understood by those skilled in the timer art, the hereinafter described readout is caused by applying a reverse current through E from terminal 4 of P. The reverse current causes the silver to be redeposited onto its original electrode. The time required to accomplish redepositing of the silver is porportional to the time period during which the silver was deposited. Since the depositing period is the period of activation of the transmitter, the readout time is proportional to the period of time between activation and readout.

The transmitter 47 of the heat detector unit consists of a single transistor Hartley oscillator circuit. The transistor, Q6, operates in the common base mode with the base directly connected to the positive battery voltage (at the output of saturated Q1). L1 is preferably a ferrite loop stick antenna type tuneable coil and serves the dual purpose of an oscillator tank coil (tapped) and an antenna. Positive feedback is provided by the tap of L1 being connected to the emitter of Q6 through C4.

C5 tunes L1 to the proper operating frequency and R11 provides a proper DC bias current to Q6.

The modulator 45 of the heat detector unit amplitude modulates the transmitter output with an audio frequency square wave. Q4 and Q5, coupled together in the positive feedback arrangement illustrated in FIG. 5, form an astable multivibrator circuit whose on and off times of operation are determined by the time constant of R9 and C3, and R7 and C3. The emitter and collector resistors of each stage provide the proper DC bias for that stage.

Turning now to a more detailed description of the operation of the heat detector unit illustrated in FIG. 5, when S is closed, the negative side of B is connected to C1 and R2. Since the other side of C1 is connected to the positive side of B, current begins to flow through R1 and C1, and C1 charges toward B's voltage. When the charge voltage on C1 exceeds the $V_{BE}$ voltage of Q1, current begins to flow through the base of Q1 via R2 and R3. This action turns Q1 on. When Q1 turns on, current begins flowing into the other circuits, including current through R4 to the base of Q2. This latter current flow turns Q2 on which in turn pulls more current to the base of Q1 through R3. Q1 and Q2 comprise positive feedback circuit such that once Q1 begins to turn on, Q2 is turned on thereby turning Q1 on harder. Thus, the current is increased in Q1 and Q2 until both transistors are fully on or "saturated".

Once Q2 begins to turn on and draws more base current to Q1 through R3, S may be opened and the activation curcuit 41 remains activated. Therefore, the activation circuit forms an electronic latching circuit which once activated remains so until the battery is momentarily disconnected from the circuit or until an external voltage is applied forcing the $V_{BE}$ of Q1 to drop below cutoff for a time period long enough to discharge C1 to a value below the $V_{BE}$ of Q1.

The time constant of R1 and C1 is such that the switch S must be closed for a predetermined period of time, such as ten seconds, before Q1 becomes activated. This delay is provided to insure protection against false activation due to attempted riddings, when a cow is not in heat, and against accidental switch activation by another cows head or other structure momentarily contacting S.

As previously described, the timer consisting of E and R5 starts timing as soon as current flows through Q1, by the transfer of silver atoms from one electrode to the other electrode. Moreover, Q6 immediately starts oscillating as soon as Q1 is turned on since it is immediately activated due to Q6 being connected to the collector of Q1. The astable multivibrator (Q4 and Q5) operates such that the output from the collector of Q4 drives Q3. Driving Q3, which is connected in series with B and the transmitter 47 causes the transmitter signal to be modulated. More specifically, when the collector of Q4 goes "low," Q3 turns on and saturates allowing full battery voltage to be applied to Q6. When the collector of Q4 goes "high," Q3 turns off introducing a very high resistance in series with the collector of Q6. This action would cause the transmitter's output to decrease to zero except for the existence of R6. The value of this resistor determines the minimum amplitude level of the transmitter output when it is being modulated by the action of the astable multivibrator.

Three approaches are available for replenishing the battery power discharged from B during operation. The first is to merely use a replaceable primary cell of the mercury type, for example. The second approach is to use a rechargeable battery, such as a nicad battery, and recharge the battery by connecting a voltage charger between terminals 1 and 3 of P.

The third approach to replenishing battery power involves remote charging. Two diodes designated CR2 and CR3 are provided so that remote charging will be effective. The cathode of CR2 is connected to the emitter of Q1 and the anode of CR2 is connected to the collector of Q3. The cathode of CR3 is connected to the collector of Q6 and the anode of CR3 is connected to G1.

Turning now to a description of remote charging, if L1 is placed in proximity to and in proper axial alignment with another coil driven by an oscillator with a frequency near the resonant frequency of L1 and C5, the power from the remote oscillator is coupled to L1. The alternating voltage thus generated in L1 is rectified by CR2 and CR3 and applied to B in half wave rectified pulses, thereby charging B. Consequently, by properly spacing the coil L1 and the external coil, and by properly maintaining the external oscillator voltage power, proper battery trickle charging current is maintained. The spacing and oscillator voltages are not critical, however, as long as the maximum safe charging current is not exceeded.

As briefly referred to above, a gate actuator transmitter can be utilized by the invention also. More specifically, a gate actuator transmitter is designated to actuate a gate of the type illustrated in FIGS. 1 or 2 to allow any desired cow to be automatically segregated or removed from a herd of cows. This is accomplished by attaching an activated transmitter to a suitable location on the cow prior to the negotiating an alleyway equipped with a receiver and a gate as shown in FIGS. 1 and 2. A gate actuator transmitter formed in accordance with the invention is identical to the modulator and transmitter portion of the heat detector unit illustrated in FIG. 4. It is powered directly from the battery, however, rather than through the activation circuit, since this is unnecessary if it is desired to isolate every cow that has such a transmitter attached. Also, the E-cell timer can be eliminated if the information produced by the timer is not desired. The gate actuator transmitter's battery can be recharged either by the previously described connections to the connector P, or by remote charging.

Figure 5A:
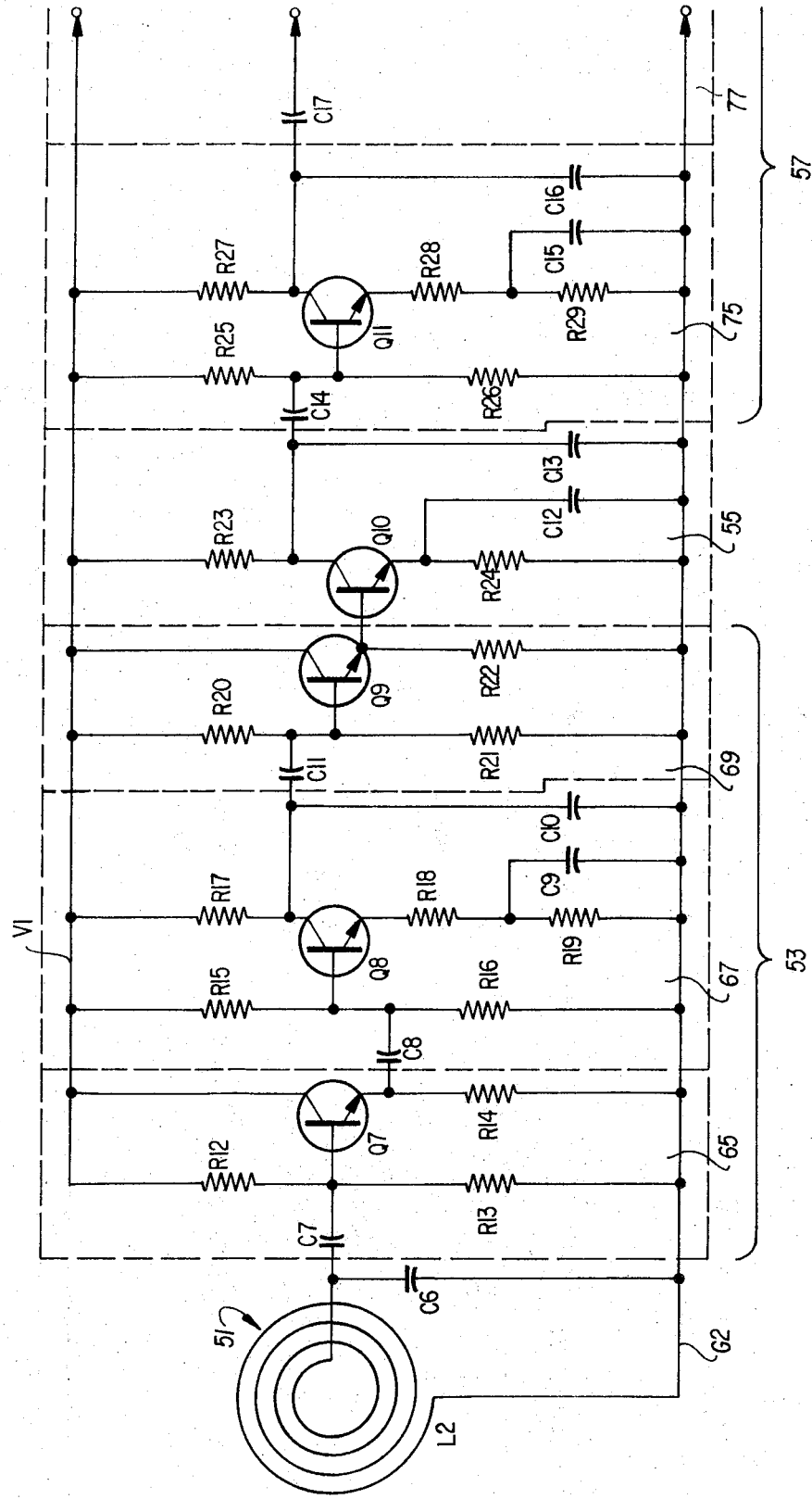
FIGS. 5A and 5B are a schematic diagram of a receiver unit.
Figure 5B:
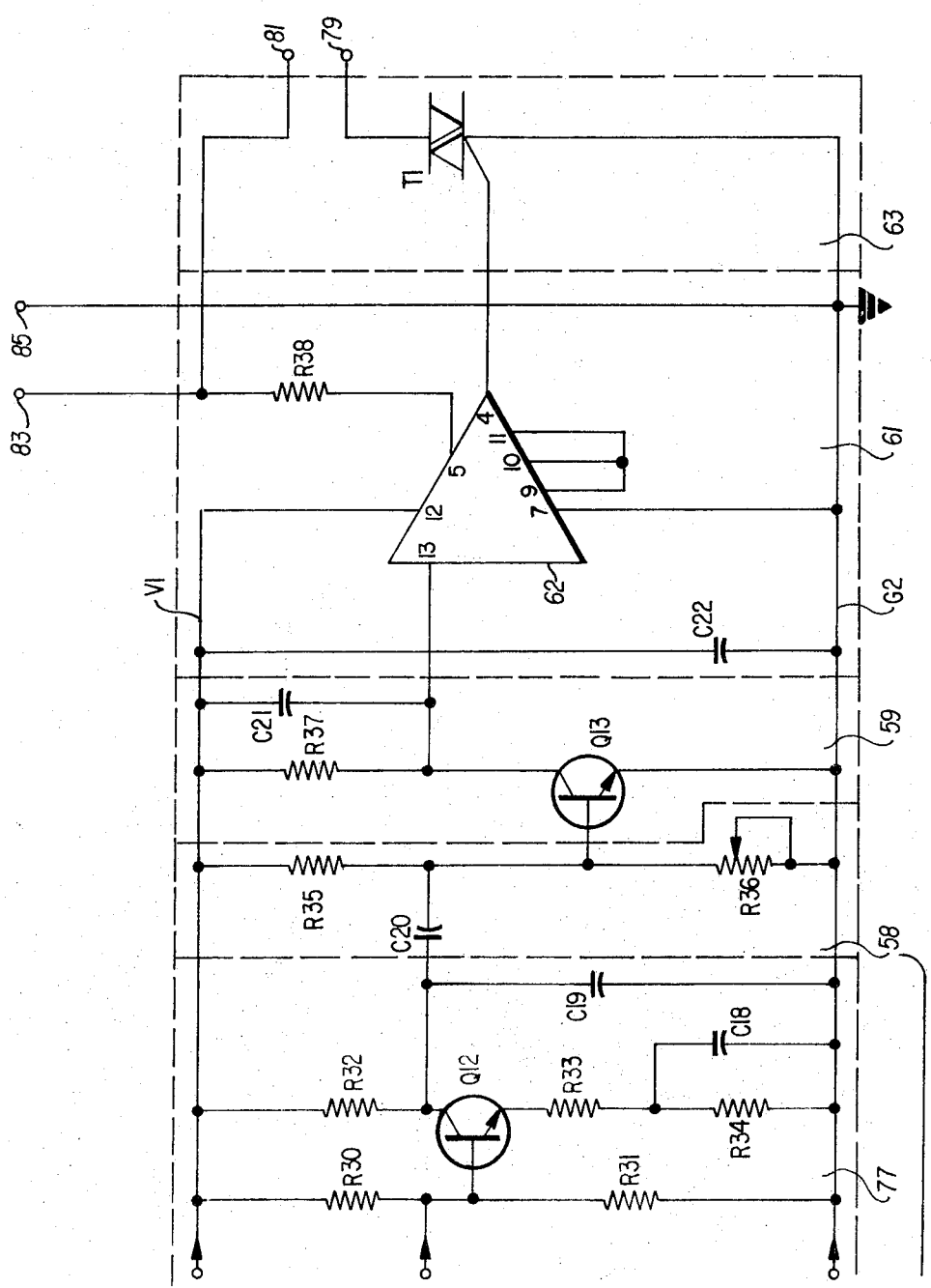

FIGS. 5A and 5B form a schematic diagram of a receiver suitable for use by the invention and generally comprise: an antenna stage 51; a plurality of RF stages 53; a demodulator 55; a plurality of AF stages 57; a DC level setting circuit 58; an audio detector 59; a TRIAC trigger circuit 61; and an output stage 63.

The antenna stage 51 comprises: an antenna loop designated L2; and, a capacitor designated C6 connected in parallel with L2. The inductance of L2 and the capacitance of C6 are such that the antenna is tuned to the frequency of the transmitter 47 illustrated in FIG. 4.

The RF stages 53 comprises: an emitter follower impedance transforming amplifier 65; a partially bypassed common emitter amplifier 67; and, an emitter follower amplifier 69.

The emitter follower impedance transforming amplifier 65 comprises: a capacitor designated C7; an NPN transistor designated Q7; and, three resistors designated R12, R13 and R14. One of the junctions between L2 and C6 is connected to ground designated G2 and the other junction is connected through coupling capacitor C7 to the base of Q7. The collector of Q7 is connected to a power bus designated V1 and the emitter of Q7 is connected through R14 to G2. The base of Q7 is also connected through R12 to V1 and through R13 to the G2. The emitter follower impedance transforming amplifier 65 acts as an impedance matching transformer to impedance match the impedance of the antenna stage 51 to the following amplifier stage, i.e., the partially bypassed common emitter amplifer 67.

The partially bypassed common emitter amplifier 67 comprises: three capacitors designated C8, C9 and C10; a NPN transistor designated Q8; and, five resistors designated R15, R16, R17, R18, and R19. The emitter of Q7 is coupled through coupling capacitor C8 to the base of Q8. The base of Q8 is connected through R15 to V1 and through R16 to G2. The collector of Q8 is connected through R17 to V1 and the emitter of Q8 is connected through R18 in series with R19 to G2. C9 is connected in parallel with R19. C10 is connected between the collector of Q8 and G2.

Both R18 and R19 are required for DC bias purposes, however, only R18 is needed for signal gain. Therefor, R19 is bypassed by C9 at the signal frequency. Since the gain of the partially bypassed common emitter amplifier 67 is essentially controlled by the ratio of R17 to R18 it is nearly independent of changes in transistor parameters with respect to temperature and other considerations. The value of C8 is chosen to provide low frequency gain roll off and C10 is chosen to provide high frequency roll off. This combination provides a band pass frequency response characteristic for the amplifier without the necessity of using inductance. The band is wide enough to aleviate the necessity for tuning except at the input coil (antenna coil L2). As a matter of fact, C6 is selected to achieve the desired resonate frequency.

The emitter follower amplifier 69 comprises: a capacitor designated C11; an NPN transistor designated Q9; and, three resistors designated R20, R21 and R22. C11 is a coupling capacitor that couples the collector of Q8 to the base of Q9. The base of Q9 is also connected through R20 to V1 and through R21 to G2. The collector of Q9 is connected to V1 and the emitter of Q9 is connected through R22 to G2. The emitter follower amplifier acts as a conventional emitter follower amplifier and amplifies the signal at the collector for Q8 and applies it to the demodulator 55.

The demodulator 55 comprises: an NPN transistor designated Q10; two capacitors designated C12 and C13; and, two resistors designated R23 and R24. The base of Q10 is connected to the emitter of Q9 and the collector of Q10 is connected through R23 to V1 and through C13 to G2. The emitter of Q10 is connected through R24 in parallel with C12 to G2. Detection or demodulation is performed in the emitter-base junction of Q4 and the rectified signal appears across C12. The detected modulation signal existing on C12 is amplified by the gain of Q10 and also appears across R23. Frequency response is determined by C13 and a coupling capacitor designated C14 which couples the collector of Q10 to the input of the first of the AF stages 57. The frequency response is determined such that a bandpass frequency response characteristic centered at the modulation frequency is provided by the demodulator.

The AF stages 57 comprise: first and second common emitter amplifiers 75 and 77. The first common emitter amplifier comprises: C14 and two additional capacitors designated C15 and C16; an NPN transistor designated Q11; and, five resistors designated R25, R26, R27, R28, and R29. C14 couples the collector of Q10 to the base of Q11. In addition, the base of Q11 is connected through R25 to the V1 and through R26 to G2. The collector of Q11 is connected through R27 to V1. The emitter of Q11 is connected through R28 in series with R29 to G2. C15 is connected in parallel with R29. C16 connects the collector of Q11 to G2.

The second common emitter amplifier 77 comprises: three capacitors designated C17, C18, and C19; and an NPN transistor designated Q12; and, five resistors designated R30, R31, R32, R33, and R34. C17 couples the collector Q11 to the base of Q12. The base of Q12 is also connected through R30 to V1 and through R31 to G2. The collector of Q12 is connected through R32 to V1 and through C19 to G2. The emitter of Q12 is connected through R33 in series of R34 to G2. C18 is connected in parallel with R34. The two common emitter amplifier stages 75 and 77 are similiar in operation to the common emitter amplifier 67 of the RF stages 53. The only difference is that these two amplifier stages are designed for maximum gain at the modulation frequency, not at the RF frequency.

The DC level setting circuit 58 comprises: a capacitor designated C20 and two resistors designated R35 and R36. R36 is actually a potentiometer and R35 and R36 are connected in series between V1 and G2. The junction between R35 and R36 is connected to the collector of Q12 through C20. By adjusting R36, the level of the voltages applied to the audio detector 59 is controllable.

The audio detector 59 comprises: an NPN transistor designated Q13; a capacitor designated C21; and a resistor designated R37. The base of Q13 is connected to the junction between R35 and R36. The collector of Q13 is connected through R37 to V1 and the emitter of Q13 is connected directly to G2. C21 is connected in parallel with R37.

The variable resistance R36 is used to set the detector threshold level by determining how large an input signal is required to turn on Q13. The base-emitter junction of Q13 rectifies the modulation signal and delivers current spikes to R37 and C21, thereby causing a DC level porportional to the modulation signal level to appear across R37. This DC level is applied to the TRIAC trigger circuit 61.

The TRIAC trigger circuit 61 comprises: an integrated circuit 62 such as RCA integrated circuit 3059; and a resistor designated R38. The output circuit 63 comprises a thyristor T1.

The collector of Q13 is connected to terminal 13 (the input) of the integrated circuit. The control terminal of T1 is connected to terminal 4 (the output) of the integrated circuit and one terminal of T1 is connected to a load terminal 79. The other load terminal 81 is connected to a power line terminal 83 and through R38 to terminal 5 of the integrated circuit 62. The other terminal of T1 and the other power line terminal 85 are connected to G2. Terminal 7 of the integrated circuit 62 is connected to G2 and terminal 12 is connected to V1 to apply the biasing voltage to V1. In other words the integrated circuit includes a terminal which applies power to V1 which provided the bias voltage for the heretofor described circuit elements.

In operation, the integrated circuit 62 turns on T1 when the DC voltage on terminal 13 drops below a predetermined DC level. T1 also only applies the power line voltage to the load terminals when the input to the integrated circuit crosses through zero. Due to this manner of switching, radiated noise due to AC line switching transients is prevented from causing erroneous operation of the overall system.

A further capacitor designated C22 is connected between V1 and G2. C22 is a filter capacitor that filters the power supply voltage applied to V1 by the integrated circuit 62.

It will be appreciated from the foregoing description of FIG. 5 that when the thyristor turns on, power is applied to the load terminal 79 and 81. The load may be a light, a bell, or a gate actuator solenoid, as required. The power applied to the power line terminals is AC power when a thyristor is used.

Figure 6A:
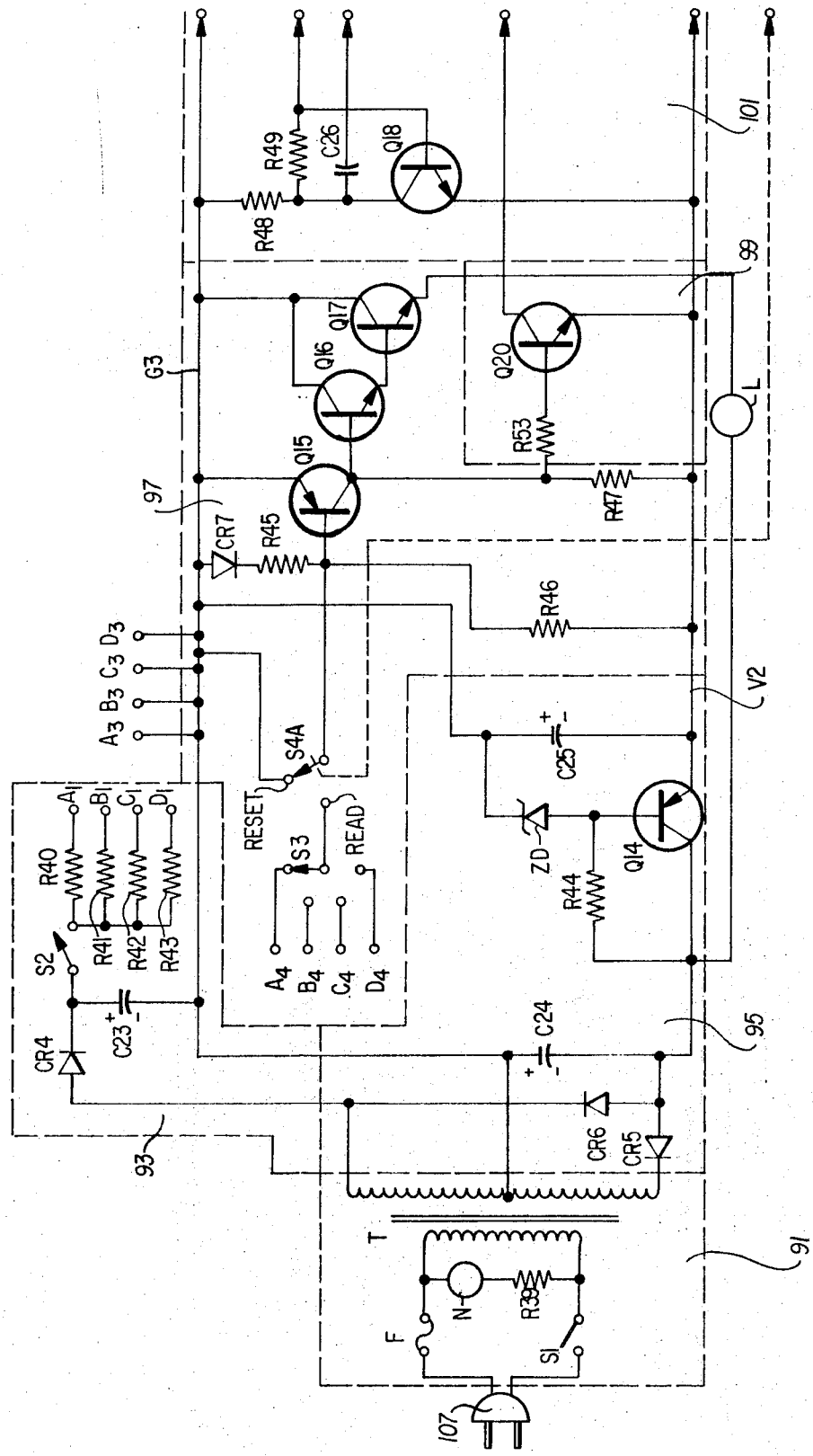
FIGS. 6A and 6B are a schematic diagram of a readout-charger unit.
Figure 6B:
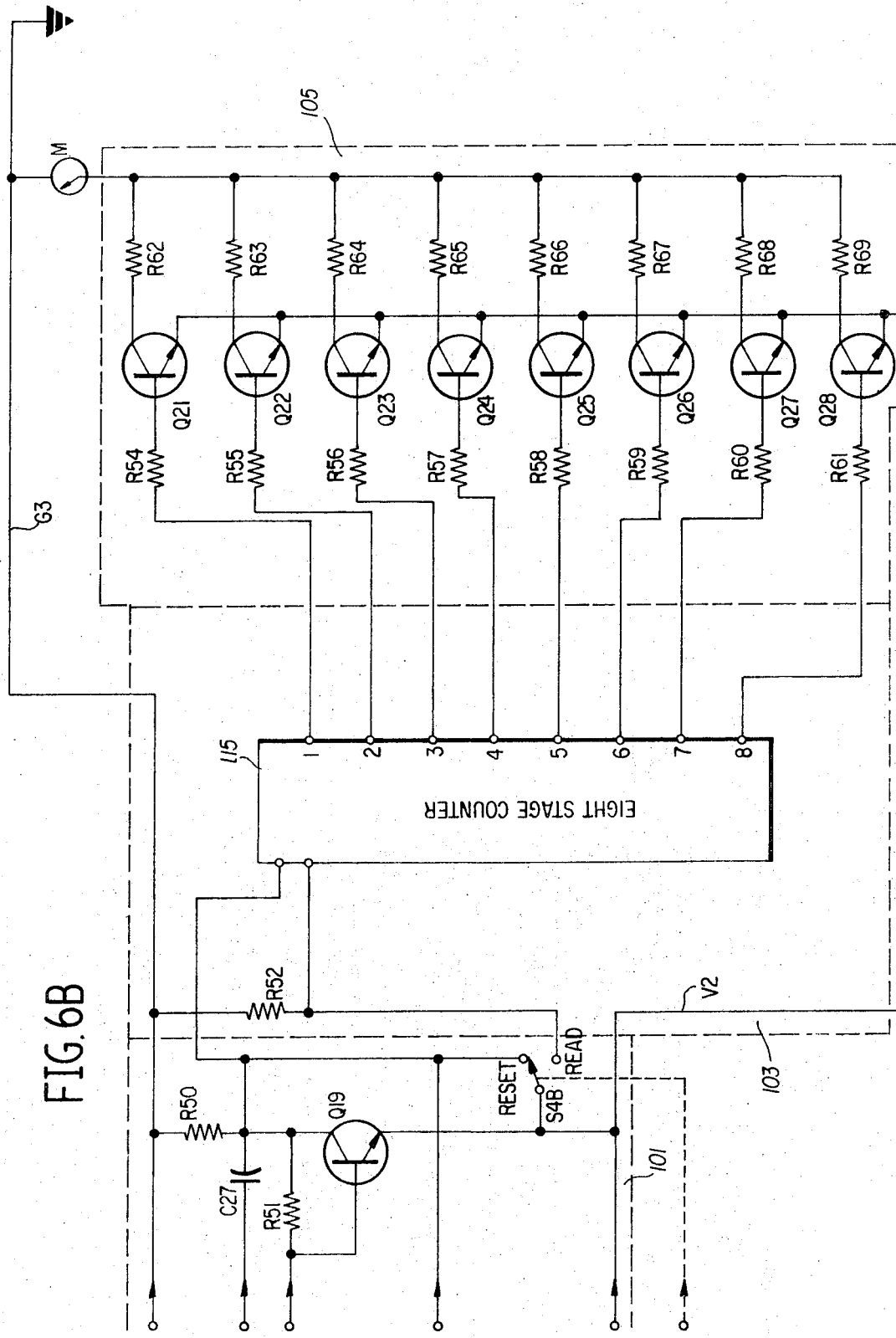

FIGS. 6A and 6B form a schematic diagram of a readout-charger unit suitable for use by the invention and comprise; a power circuit 91; a charger circuit 93; a power and regulator circuit 95; a read control circuit 97; a stop circuit 99; a multi-vibrator 101; a digital counter 103; and a digital-to-analog convertor 105. In order that a plurality of heat detector units can be sequentially read and commonly charged, a plurality of connector terminals are provided. These terminals are illustrated in FIG. 6 and the connections thereto are hereinafter described. Generally, the terminals are designated A, B, C, and D with subscripts 1, 2, 3 and 4. The subscripts relate to the terminals of the connector P illustrated in FIG. 4 and A, B, C, and D relating to the different heat detector units. In other words heat detector unit A will be connected to terminals $A_1$, $A_3$ and $A_4$; heat detector unit B will be connected to terminals $B_1$, $B_3$ and $B_4$; etc.

The power circuit 91 comprises: a fuse designated F, an on/off switch designated S1; a neon lamp designated N; a resistor designated R39; and, a step down center tapped transformer designated T. A plug 107 adapted for connection to a suitable power supply such as a 110 volt AC source, are also illustrated in FIG. 6. Plug 107 is connected to a series circuit comprising S1, which is a single pole throw switch, R39, N and F. The primary winding of T is connected in parallel with N and R39. The secondary winding of T includes a center tap as well as end terminals. T steps down the line voltage, applied to plug 107, to a power level suitable for use by the remaining circuitry illustrated in FIG. 6 and hereinafter described. When S1 is closed T is energized and N provides an indication of the energized state of T.

The charger circuit 93 comprises: a single pole, single throw switch designated S2; a diode designated CR4; a capacitor designated C23; and, four resistors designated R40, R41, R42, and R43. The anode of CR4 is connected to one end terminal of T and the cathode of CR4 is connected to one end of C23. The other end of C23 is connected to the center tap of T. The junction between CR4 and C23 is connected to one terminal of S2. The other terminal of S2 is connected to one side of each of R40, R41, R42, and R43. The other side of R40 is connected to terminal $A_1$, the other side of R41 is connected to terminal $B_1$, the other side of R42 is connected to terminal $C_1$ and the other side of R43 is connected to terminal $D_1$. Terminals $A_3$, $B_3$, $C_3$ and $D_3$ are all connected to the center tap of T via a ground designated C3.

CR4 and C23 rectify and filter, respectively, the AC signal on the secondary winding of T to provide a DC voltage for battery charging that is applied through R40–R43 to the heat detector units connected to the charger circuit 93 via $A_1$ through $D_1$ and $A_3$ through $D_3$. R40-R43 are current limiting resistors that limit the current flow during charging. S2, of course, must be closed for R40–R43 to pass current.

The power and regulator circuit 95 comprises: two diodes designated CR5 and CR6; zener diode designated ZD; two capacitors designated C24 and C25; a PNP transistor designated Q14; and, a resistor designated R44. The cathode of CR6 is connected to the same end terminal of the secondary winding of T as is the anode of CR4. The cathode of CR5 is connected to the other end terminal of T. The anodes of CR5 and CR6 are connected together and to one end of C24. The other end of C24 is connected to the center tap of the secondary winding of T. Hence, full wave rectification is provided at the junction of CR5, CR6 and C24. This junction is connected to the collector of Q14. The base of Q14 is connected to the collector of Q14 and through R44. The emitter of Q14 is connected to a negative voltage bus designated V2. The emitter of Q14 is also connected through C25 to G3 and to the cathode of ZD. The anode of ZD is connected to the base of Q14.

In general, CR5 and CR6 provide rectification as indicated above. C24 filters the full wave rectified signal and applies it to Q14. Q14 regulates the voltage applied to its collector, using ZD as a reference. C25 provides additional filtering. Thus, a rectified, filtered signal is applied to V2. This voltage powers the remaining, hereinafter described, portions of the readout-charger unit illustrated in FIG. 6.

The read control circuit 97 comprises: a diode designated CR7; a PNP transistor designated Q15; two NPN transistors designated Q16 and Q17; three resistors designated R45, R46 and R47; and, a switch designated S3. S3 is a selective switch having a common terminal and four remote terminals. The four remote terminals are separately connected to terminals $A_4$, $B_4$, $C_4$ and $D_4$ so that either the A, B, C or D heat detector unit can be selectively connected to the common terminal of S3.

The read control circuit also includes one half of a double pole, double throw switch designated S4A. The other half of the switch, designated S4B, comprises a portion of the multivibrator that is hereinafter described. S4A and S4B have a common terminal and a pair of remote terminals designated "reset" and "read" which operate conjointly, i.e., when S4A is in the read position so is S4B and when S4A is in the reset position so is S4B. The common terminal of S3 is connected to the read terminal of S4A. The reset terminal of S4A is connected to G3.

The common terminal of S4A is connected through R46 to V2 and through R45 to the cathode of R7. The anode of CR7 is connected to G3. The junction between R45 and R46 is also to the base of Q15. The emitter of Q15 is connected to G3. The collector of Q15 is connected through R47 and V2 and to the base of Q16. The collectors of Q16 and Q17 are connected together and to G3. The emitter of Q16 is connected to the base of Q17. The emitter of Q17 is connected through an indicator lamp designated L to the junction between CR5 and CR6. It will be appreciated from the foregoing description that Q16 and Q17 are connected in a manner such that they form a Darlington circuit.

The read control circuit operates in a manner such that when S4A is in the reset position the base of Q15 is grounded and Q15 is off. When S4A is in the read position, and assuming a heat detector unit is connected between A4 and A3, for example, Q15 remains off until the E-cell voltage of the heat detector rises to indicate that the E-cell has been entirely "readout". More specifically, when S4A is switched to the read position a constant current flows through the E-cell via R46 (which is a precision resistor) at a controlled rate. This current is in reverse to the initial current applied by the activated heat detector unit. As will be understood by those skilled in the art, the E-cell has a low (almost negligible) voltage across it's terminals during readout. Thus, Q15 is maintained in an off condition during readout. On the other hand, when the E-cell charge is completely read-out its voltage rises until it reaches the $V_{BE}$ voltage of Q15. When this occurs Q15 is switched on and applies a voltage to the Darlington circuit comprising Q16 and Q17. The Darlington circuit, in turn, passes a current through L to indicate that readout is complete.

The multivibrator 101 comprises: two NPN transistors designated Q18 and Q19; two capacitors designated C26 and C27; and, four resistors designated R48, R49, R50 and R51. The emitters of Q18 and Q19 are connected to V2. The collector of Q18 is connected through R48 to G3 and the collector of Q19 is connected through R50 to G3. R49 is connected in series with C27 between the collectors of Q18 and Q19. The junction between R49 and C27 is connected to the base of Q18. C26 is connected in series with R51 between the collectors of Q18 and Q19. The junction between R51 and C26 is connected to the base of Q19.

In addition to the foregoing components, as previously stated the multivibrator 101 includes S4B. The common terminal of S4B is connected to the emitter of Q19 and to V2. The read terminal of S4B is connected through a resistor designated R52, which forms a portion of the counter circuit, to G3. The reset terminal of S4B is connected to the collector of Q19. Consequently, when S4B is in the reset position the collector-emitter junction of Q19 is shorted so that the multivibrator is made inoperative. On the other hand, when D4B is first switched to the read position, the multivibrator operates in a conventional manner and generates a sequence of square wave clock pulses. The frequency of the clock pulses is at a rate appropriate for a calibrated readout to occur. The clock pulses are applied, in the manner hereinafter described, to the counter circuit 103.

The stop circuit 99 comprises: an NPN transistor designated Q20; and, a resistor designated R53. One end of R53 is connected to the collector of Q15 and the other end is connected to the base Q20. The emitter of Q20 is connected to V2 and the collector of Q20 is connected to the collector of Q19. In operation, when the E-cell is fully readout and Q15 is switched on, its collector voltage turns Q20 on. When this occurs, Q20 connects the collector of Q19 to V2 and shorts Q19 to prevent the occurrence of further clock pulses. In effect the action of Q20 is the same as the action of S4B in the reset position. To reiterate, when S4B is first turned to the read position the astable multivibrator starts to generate clock pulses. These pulses continue until the E-cell is completely readout. When this occurs, Q20 is turned on to stop the operation of the astable multivibrator.

The counter circuit 103 comprises an eight stage counter 115 and the resistor R52. The junction between R52 and the read terminal of S4B is connected to the eight stage counter 115 to apply a reset pulse thereto. In addition, the collector of Q19 is connected to the eight stage counter to apply the clock pulses generated by the multivibrator, to the eight stage counter. The eight stage counter has eight outputs which are connected to the digital-to-analog convertor 105 in the manner hereinafter described. An eight stage counter is preferably utilized so that there is a counting capability of $2^8$ or a numerical value of 256 to represent a stored E-cell charge time of approximately 25 hours. In other words 256 clock pulses equals 25.6 hours. It will be appreciated, however, that any other number of counter stages could be used as long as they are compatible with the frequency of the multivibrator and measure the desired time period.

The digital-to-analog converter 105 comprises: eight NPN transistors designated Q21–Q28; and, 16 resistors designated R54–R69. R62–R69 are precision resistors having a tolerance of about 1 percent with a decreasing value of ohmic resistance necessary to provide desired analog conversion. A table of values from one suitable set of R62–R69 is as follows:

R62 = 54.4K ohms
R63 = 27.2K ohms
R64 = 13.6K ohms
R65 = 6.8K ohms
R66 = 3.4K ohms
R67 = 1.7K ohms
R68 = 850K ohms
R69 = 425K ohms The output of the eight stages of the counter are designated 1 through 8. Output 1 is connected through R54 to the base of Q21; output 2 is connected through R55 to the base of Q22; output 3 is connected through R56 to the base of Q23; output 4 is connected through R57 to the base of Q24; output 5 is connected through R58 to the base of Q25; output 6 is connected through R59 to the base of Q26; output 7 is connected through R60 to the base of Q27; and, output 8 is connected through G1 to the base of Q28. The emitters of Q21 through Q28 are connected to V2. The collector of Q21 is connected to one end of R62; the collector of Q22 is connected to one end of R63; the collector of Q23 is connected to one end of R64; the collector of Q24 is connected to one end of R65; the collector of Q25 is connected to one end of R66; the collector of Q26 is connected to one end of R67; the collector of Q27 is connected to one end of R68; and, the collector of Q28 is connected to one end of R69. The other ends of R62 through R69 are all connected together and to one terminal of a DC meter designated M. The other terminal of M is connected to G3.

In operation, as the output stages of the eight stage counter 115 are sequentially energized, they each drive their respective transistor switched (Q21–Q28) thereby connecting their respective precision resistors R62–R69 in series with the meter and increase the current flow through the meter. This action, because it is in accordance with the digital output of the eight stage counter, is related to the value of readout from the E- cell. The eighth stage (8) switches the largest current to the meter since its current flow passes through the lowest resistance. The meter provides visual readout for the operator which is in analogue, not digital, form.

It will be appreciated from the foregoing description that the invention provides a method of and an apparatus for determining when a cow or other animal is in heat. More broadly speaking, the invention provides an event occurrance detector. That is, when an event occurs, such as a cow coming in to standing heat and being ridden by another cow, a signal is transmitted which provides an indication that the cow is in heat. The transmitted signal can be utilized to automatically segregate the cow from a herd of cows or to provide an indication to an observer, such as a herdsman on horseback, that the cow is in heat. Then, the herdsman can manually isolate the cow. In any event, once the cow is isolated it can be artificially inseminated (bred). In addition, the invention provides for the step of determining the exact time that the cow was first ridden which is a reasonably accurate indication of the onset of heat. The apparatus for carrying out this step comprises an E-cell which can be read out rapidly in digital form and then converted to analog form to provide a readable meter indication of the time between the onset of heat and the time of readout. From this information, the herdsman can determine when to artificially inseminate the cow to produce the best breeding results.

While a preferred embodiment of the invention has been illustrated and described, it will be appreciated by those skilled in the art and others that various modifications can be made therein without departing from the spirit and scope of the invention. For example, switches other than pressure sensitive switches, such as magnetic breeding switches or mucous detection devices and the like, can be used to activate the heat detection unit, if desired.

In addition to using different detectors, the invention can also be utilized to sense animal phenomena other than heat and automatically segregate animals having the sensed phenomena. Moreover, animals can be automatically segregated in accordance with a herdsman's decision by his merely attaching an activated transmitter to any animal to be segregated and allowing the animals to pass through an alleyway that includes a receiver activated gate. Hence, the invention can be practiced otherwise than as specifically described herein.

The embodiments of the invention in which an exclusive property or privilege is claimed are defined as follows:

1. Apparatus for identifying female animals in heat comprising:
   activating means responsive to a manifestation reflecting the occurrence of a state of standing heat in a female animal;
   transmitting means connected to said activating means for transmitting a signal from said animal to a place remote there from when said activating means responds to said manifestation reflecting the occurrence of a state of heat in said female animal, said transmitting means being contiguous to said female animal;
   receiving means for receiving the signal transmitted by said transmitting means; and
   indicating means connected to said receiving means to provide an identification of the female animal indicated by said transmitted signal to be in standing heat.

2. Apparatus for identifying female animals in heat as claimed in claim 1 including an alleyway through which said animals pass, said receiving means being mounted adjacent to said alleyway.

3. Apparatus for identifying female animals in heat as claimed in claim 2 wherein said alleyway includes a gate that is activated by said receiver to allow any animal transmitting a signal received by said receiver to leave said alleyway.

4. Apparatus for identifying female animals in heat as claimed in claim 3 wherein said activating means comprises a switching device that is caused to assume a predetermined position when a female animal is ridden by another animal.

5. Apparatus for identifying female animals in heat as claimed in claim 4 wherein said transmitting means comprises a heat detector unit that includes a transmitter and a modulator, said transmitter including an antenna for radiating the signal generated by said transmitter, and said modulator modulating the signal generated by said transmitter.

6. Apparatus for identifying female animals in heat as claimed in claim 5 wherein said heat detector unit also includes a timer, said activating means being adapted to activate said transmitter and said timer when said activating means assumes said predetermined position indicating that a female animal is being ridden by another animal.

7. Apparatus for identifying female animals in heat as claimed in claim 6 wherein said receiver comprises:
   an antenna for receiving the modulated signal transmitted by said transmitter;
   a plurality of RF stages connected to said antenna for amplifying the signal sensed by said antenna;
   a demodulator connected to the output of said plurality of RF stages for demodulating the signal received by said antenna and producing the modulation of said transmitted signal;
   a plurality of AF stages connected to the output of said demodulator for amplifying the modulation signal;
   an audio detector connected to the output of said plurality of AF stages for detecting the modulation signal; and
   an output stage connected to the output of said audio detector for generating a suitable signal when said antenna receives a modulated signal from said transmitter.

8. Apparatus for identifying female amimals in heat as claimed in claim 11 including a readout-charger circuit suitable for connection to said transmitter for recharging said transmitter and for reading out the time information recorded by said timer.

9. Apparatus for identifying female animals in heat as claimed in Claim 8 wherein said read-out charger circuit comprises:
   a charger circuit suitable for charging said transmitter;
   an astable multivibrator;
   a read control circuit connected to said astable multivibrator for reading information in said timer and controlling the output of said astable multivibrator;

a counter connected to the output of said astable multivibrator for counting the pulses generated by said astable multivibrator;

an analog-to-digital converter connected to the output of said counter for converting the digital output of said counter into an analog signal; and, an analog indicator connected to the output of said analog-to-digital converter.

10. Apparatus for identifying female animals in heat as claimed in claim 1 wherein said activating means comprises a switching means that is activated to a predetermined position in response to a female animal being ridden by another animal.

11. Apparatus for identifying female animals in heat as claimed in claim 10 wherein said transmitting means comprises a heat detector unit that includes a transmitter and a modulator, said transmitter including an antenna for radiating the signal generated by said transmitter, and said modulator modulating the signal generated by said transmitter.

12. Apparatus for identifying female animals in heat as claimed in claim 11 wherein said heat detector unit also includes a timer, said activating means being adapted to activate said transmitter and said timer when said activating means receives an indication that a female animal is being ridden by another animal.

13. Apparatus for identifying female animals in heat as claimed in claim 12 including a readout-charger circuit suitable for connection to said transmitter for recharging said transmitter and for reading out the time information recorded by said timer.

14. Apparatus for identifying female animals in heat as claimed in claim 1 including remote charging means for remotely charging said transmitting means.

15. Apparatus for identifying female animals in heat and obtaining a time reference with respect thereto, comprising:
  activating means responsive to a manifestation reflecting the occurrence of a state of standing heat in a female animal;
  timing means connected to said activating means for recording an elapsed period of time starting when said activating means responds to said manifestation reflecting the occurrence of a state of heat in said female animal, said timing means being contiguous to said female animal; and,
  readout means connected to said timing means to provide an indication of the elapsed time recorded by said timing means.

16. Apparatus for identifying female animals in heat as claimed in claim 24 wherein said activating means comprises a switching device that is caused to assume a predetermined position when a female animal is ridden by another animal.

17. Apparatus for identifying female animals in which a predetermined phenomena has occurred comprising:
  activating means responsive to a manifestation reflecting the occurrence of a predetermined phenomena in a female animal;
  transmitting means connected to said activating means for transmitting a signal from said animal to a place remote there from when said activating means responds to said manifestation reflecting the occurrence of said predetermined phenomena in a female animal, said transmittting means being contiguous to said animal;
  receiving means for receiving the signal transmitted by said transmitting means; and
  indicating means connected to said receiving means to provide an identification of the female animal indicated by said transmitted signal to be the animal in which said phenomena has occurred.

18. Apparatus for identifying female animals in which a predetermined phenomena has occurred as claimed in claim 17 including an alleyway through which said animals pass, said receiving means being mounted adjacent to said alleyway.

19. Apparatus for identifying female animals in which a predetermined phenomena has occurred as claimed in claim 18 wherein said alleyway includes a gate that is activated by said receiver to allow any animal transmitting a signal received by said receiver to leave said alleyway.

20. A method of identifying female animals in heat, said method comprising the steps of:
  providing a female animal with a pressure actuatable signal transmitting device mounted on the hindquarter of the animal adjacent to the tail area, said transmitting device when actuated transmitting a signal from said device;
  permitting at least a second animal in the vicinity to have access to said female animal;
  permitting said second animal to apply pressure to the hindquarters of said female animal to activate said transmitting device; and
  receiving the signal transmitted from said transmitting device and identifying therefrom said female animal indicated to be in heat.

21. The method of identifying female animals in heat as set forth in claim 20 including the step of isolating said female animal identified to be in heat from other animals not so identified to be in heat.

22. The method of identifying female animals in heat as set forth in claim 21 including the step of measuring the time between the start of transmission of said transmitting means and the time of isolation of said felmale animal in standing heat.

23. A method of identifying female animals in heat as set forth in claim 22 wherein said isolating steps includes the sub-steps of:
  directing female animals through an alleyway; and
  opening a gate in said alleyway for any animal passing through said alleyway transmitting a signal identifying that animal to be in heat.

24. A method of identifying female animals in heat and obtaining a time reference with respect thereto, said method comprising the steps of:
  providing a female animal with a device for transmitting a signal from said animal to a place remote there from in response to a manifestation reflecting the occurrence of a state of heat in a female animal;
  activating a timer connected with said transmitting device when said device starts to transmit said signal;
  receiving said signal transmitted from said transmitting device and identifying therefrom said female animal indicated to be in heat; and
  reading the timer to determine the period of time between the commencement of signal transmission and the time the timer is read.

25. A method of identifying female animals in heat and obtaining a time reference with respect thereto as set forth in claim 24 including the step of isolating said female animal in standing heat ffrom other animals not in standing heat.

26. A method of identifying female animals in heat and obtaining a time reference with respect thereto as set forth in claim 25 wherein said isolating step includes the sub-steps of:
   directing female animals through an alleyway; and
   opening a gate in said alleyway for any animal passing through said alleyway transmitting a signal identifying that animal to be in heat.

27. A method of identifying female animals in which a predetermined phenomena has occurred, and obtaining a time reference with respect thereto, said method comprising the steps of:
   providing a female animal with a device for transmitting a signal from said animal to a place remote there from in response to a manifestation reflecting the occurrence of a predetermined phenomena in a female animal;
   activating a timer connected with said transmitting device when said device starts to transmit said signal;
   receiving said signal transmitted from said transmitting device and identifying therefrom said female animal in which said predetermined phenomena has occurred; and
   reading the timer to determine the period of time between the commencement of signal transmission and the time the timer is read.

28. A method of identifying female animals in which a predetermine phenomena has occurred and obtaining a time reference with respect thereto as set forth in claim 27 including the step of isolating said animal having said phenomena from other animals not indicated to have said phenomena.

29. A method of identifying female animals in which a predetermined phenomena has occurred and obtaining a time reference with respect thereto as set forth in claim 28 wherein said isolating step includes the sub-steps of:
   directing animals through an alleyway; and
   opening a gate in said alleyway for any animal passing through said alleyway transmitting a signal indicating said animal has said phenomena, said sub-steps being carried out prior to said reading of said timer.

* * * * *

DETACH HERE BEFORE MAILING THE TYPED CERTIFICATE TO THE PATENT OFFICE ………

UNITED STATES PATENT OFFICE
CERTIFICATE OF CORRECTION

Patent No. 3,844,273        Dated October 29, 1974

Inventor(s)   Jerry H. Polson

It is certified that error appears in the above-identified patent and that said Letters Patent are hereby corrected as shown below:

Column 12, line 2, "C3" should read -- G3 --

Column 13, line 48, "D4B" should read -- S4B --

Column 13, line 58, after "base" insert -- of --

Column 16, line 55, "11" should read -- 2 --

Column 17, line 51, "24" should read -- 15 --.

Signed and sealed this 4th day of February 1975.

(SEAL)
Attest:

McCOY M. GIBSON JR.
Attesting Officer

C. MARSHALL DANN
Commissioner of Patents